US012058608B2

(12) United States Patent
Yamada et al.

(10) Patent No.: US 12,058,608 B2
(45) Date of Patent: Aug. 6, 2024

(54) COMMUNICATION METHOD, DIRECTION-OF-ARRIVAL ESTIMATING METHOD, POSITION ESTIMATING METHOD, COMMUNICATION SYSTEM, DIRECTION-OF-ARRIVAL ESTIMATING SYSTEM, POSITION ESTIMATING SYSTEM, AND RECEIVER

(71) Applicant: ALPS ALPINE CO., LTD., Tokyo (JP)

(72) Inventors: Yukimitsu Yamada, Miyagi (JP); Mitsunobu Inoue, Miyagi (JP)

(73) Assignee: ALPS ALPINE CO., LTD., Tokyo (JP)

(*) Notice: Subject to any disclaimer, the term of this patent is extended or adjusted under 35 U.S.C. 154(b) by 358 days.

(21) Appl. No.: 17/659,886

(22) Filed: Apr. 20, 2022

(65) Prior Publication Data

US 2022/0248310 A1 Aug. 4, 2022

Related U.S. Application Data

(63) Continuation of application No. PCT/JP2020/036865, filed on Sep. 29, 2020.

(30) Foreign Application Priority Data

Oct. 25, 2019 (JP) ................................ 2019-194757

(51) Int. Cl.
*H04L 69/22* (2022.01)
*G01S 1/20* (2006.01)
(Continued)

(52) U.S. Cl.
CPC ............... *H04W 48/16* (2013.01); *G01S 1/20* (2013.01); *H04L 69/22* (2013.01); *H04W 4/80* (2018.02); *H04W 64/00* (2013.01)

(58) Field of Classification Search
CPC ..... G01B 5/04; G01S 1/20; G01S 3/45; G01S 3/46; G01S 5/04; H04B 7/24;
(Continued)

(56) References Cited

U.S. PATENT DOCUMENTS 10,560,829 B2 * 2/2020 Haverinen .............. H04W 4/80
2008/0046545 A1 * 2/2008 Koren ................... H04W 28/18
709/220
(Continued)

FOREIGN PATENT DOCUMENTS

JP 2003-163652 6/2003
JP 2014-530524 11/2014
JP 2019-518205 6/2019

OTHER PUBLICATIONS

English Translation of Kinoshita (JP 2003163652A), pp. 1-12, Jun. 6, 2006.*
(Continued)

*Primary Examiner* — Frank Duong
(74) *Attorney, Agent, or Firm* — IPUSA, PLLC

(57) ABSTRACT

A communication method includes: transmitting, by a transmitter, advertising packets having different data lengths per transmitting channel; and identifying, by a receiver, a transmitting channel of an advertising packet based on data length information contained in header information in the advertising packet, and the receiver receives remaining data in the advertising packet when the identified transmitting channel and a receiving channel match, and not receive the remaining data in the advertising packet when the identified transmitting channel and the receiving channel do not match.

10 Claims, 9 Drawing Sheets

(51) Int. Cl.
*H04W 4/80* (2018.01)
*H04W 48/16* (2009.01)
*H04W 64/00* (2009.01)

(58) Field of Classification Search
CPC ........ H04L 69/22; H04W 4/02; H04W 4/029; H04W 4/80; H04W 8/005; H04W 28/06; H04W 48/16; H04W 64/00; H04W 64/006; H04W 84/10
See application file for complete search history.

(56) References Cited

U.S. PATENT DOCUMENTS

| | | | | |
|---|---|---|---|---|
| 2013/0065584 | A1 | 3/2013 | Lyon et al. | |
| 2013/0188538 | A1* | 7/2013 | Kainulainen ............. | G01S 5/04 370/310 |
| 2017/0303071 | A1 | 10/2017 | Haverinen et al. | |

OTHER PUBLICATIONS

International Search Report for PCT/JP2020/036865 mailed on Dec. 8, 2020.

* cited by examiner

| | HEADER | PAYLOAD | | | | | | | | | | | | | | | | | | | | | | | |
|---|---|---|---|---|---|---|---|---|---|---|---|---|---|---|---|---|---|---|---|---|---|---|---|---|---|
| 37 CH | 0x2246 | 0x3c | 0xdd | 0x52 | 0x49 | 0xed | 0x43 | 0x01 | 0x7a | 0x34 | 0xf9 | 0x99 | 0x0d | 0x0f | 0x32 | 0xa2 | 0x8e | 0x61 | 0x91 | 0x56 | 0xdb | 0x09 | 0x5e | 0xff | 0xc2 |
| 38 CH | 0x2146 | 0xd1 | 0xe4 | 0x67 | 0xca | 0x41 | 0xc8 | 0x88 | 0x3a | 0x86 | 0x45 | 0x5a | 0x6d | 0x27 | 0x78 | 0xfd | 0x0b | 0x97 | 0x0d | 0xcc | 0x1a | 0xdf | 0x9b | 0xbb | |
| 39 CH | 0x2046 | 0x8a | 0xf3 | 0x74 | 0x4b | 0x25 | 0xb1 | 0x0f | 0x05 | 0xe8 | 0xd1 | 0xe4 | 0x67 | 0xca | 0x41 | 0xc8 | 0x88 | 0x3a | 0x86 | 0x45 | 0x5a | 0x6d | 0x27 | | |

COMMUNICATION METHOD, DIRECTION-OF-ARRIVAL ESTIMATING METHOD, POSITION ESTIMATING METHOD, COMMUNICATION SYSTEM, DIRECTION-OF-ARRIVAL ESTIMATING SYSTEM, POSITION ESTIMATING SYSTEM, AND RECEIVER

CROSS-REFERENCE TO RELATED APPLICATION

This application is a continuation application of International Application No. PCT/JP2020/036865, filed on Sep. 29, 2020, and designated the U.S., which is based upon and claims priority to Japanese Patent Application No. 2019-194757, filed on Oct. 25, 2019, the entire contents of which are incorporated herein by reference.

BACKGROUND OF THE INVENTION

1. Field of the Invention

This disclosure relates to a communication method, a direction-of-arrival estimating method, a position estimating method, a communication system, a direction-of-arrival estimating system, a position estimating system, and a receiver.

2. Description of the Related Art

Conventionally, there has been a method of wireless communication by a wireless device, the method including: generating, by the wireless device, a protocol data unit (PDU) header of an angle-of-arrival (AoA) packet; and generating, by the wireless device, a PDU payload of the AoA packet corresponding to the PDU header, and, in this method, generating the PDU payload includes: inserting a supplemental field into the PDU payload to enable another wireless device to determine an angle of arrival of the AoA packet; inserting a cyclic redundancy check (CRC) field into the PDU payload, the CRC field corresponding to a CRC of at least the supplemental field; and transmitting the AoA packet with a single antenna of the wireless device (see, for example, Patent Document 1).

RELATED-ART DOCUMENTS

Patent Document

[Patent Document 1] Japanese Unexamined Patent Application Publication No. 2019-518205

Now, the above conventional method does not disclose configuring all transmitting channels to have different data lengths to make it possible to distinguish between each advertising packet's transmitting channel. An advertising packet's data length can be determined by its header information.

SUMMARY OF THE INVENTION

According to at least one aspect of the present disclosure, a communication method includes: transmitting, by a transmitter, advertising packets having different data lengths per transmitting channel; and identifying, by a receiver, a transmitting channel of an advertising packet based on data length information contained in header information of the advertising packet, and the receiver receives rest of data in the advertising packet when the identified transmitting channel and a receiving channel match, and not receive the rest of the data in the advertising packet when the identified transmitting channel and the receiving channel do not match.

DESCRIPTION OF THE PREFERRED EMBODIMENTS

Now, an embodiment that employs the communication method, the direction-of-arrival estimating method, the position estimating method, the communication system, the direction-of-arrival estimating system, the position estimating system, and the receiver of the present disclosure will be described below.

According to the present disclosure, it is possible to provide a communication method, a direction-of-arrival estimating method, a position estimating method, a communication system, a direction-of-arrival estimating system, a position estimating system, and a receiver, in which header information serves as a basis for determining the need for the remaining data.

Embodiment

Figure 1:
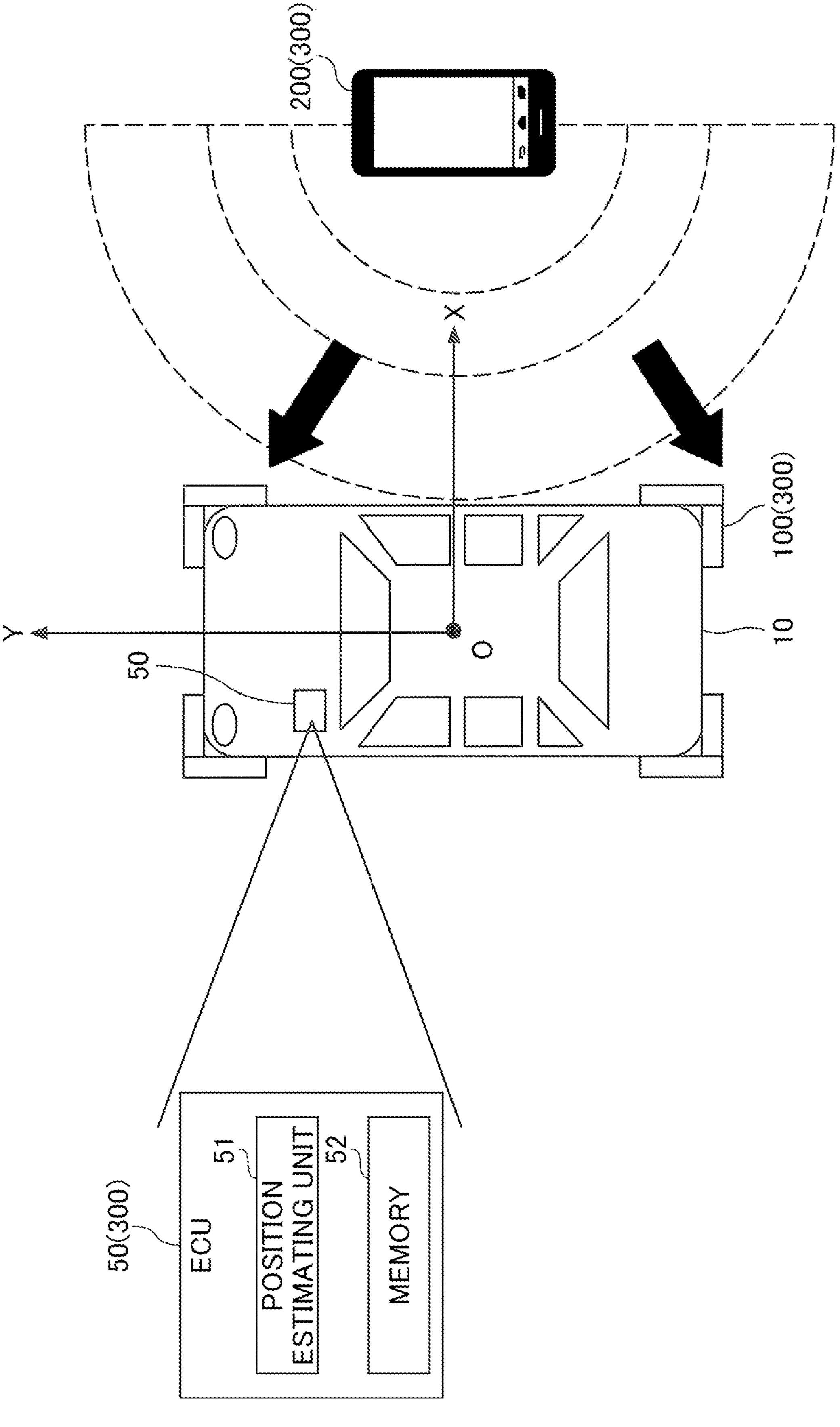
FIG. 1 is a diagram that explains a position estimating system 300 according to an embodiment.

FIG. 1 is a diagram that explains a position estimating system 300 according to an embodiment. The position estimating system 300 includes an ECU (Electronic Control Unit) 50 and a receiver 100, which are mounted on a vehicle 10, and includes a smartphone 200. Therefore, the reference sign "300" of the position estimating system 300 is written in parentheses next to the reference signs of the ECU 50, the receiver 100, and the smartphone 200.

The position estimating system 300 is used for an automatic parking system that allows the vehicle 10 to park in a parking position autonomously, by transmitting remote commands to the vehicle 10 via wireless communication. The functions required for such an automatic parking system are installed in the ECU 50, the receiver 100, and the smartphone 200, for example, but will not be described in detail herein.

Although the vehicle 10 has multiple ECUs, FIG. 1 shows only an ECU 50 that is related to the position estimating system 300. The ECU 50 includes a position estimating unit 51 for estimating the position of the vehicle 10, and a memory 52. The ECU is implemented by a computer including a CPU (Central Process unit), a RAM (Random Access Memory), a ROM (Read Only Memory), an internal bus, and so forth. The position estimating unit 51 is a function that is executed on the ECU 50 and that is shown in the form of a functional block. Furthermore, the memory 52 functionally represents the memory of the ECU 50.

Multiple receivers 100 are provided in the vehicle 10. Each receiver 100 has multiple antennas. For example, a total of eight receivers 100 are provided, two at each of the four corners of the vehicle 10. The receivers 100 receive BLE (Bluetooth (registered trademark) Low Energy) advertising packets transmitted from the smartphone 200.

The smartphone 200 is an example of a transmitter that transmits BLE advertising packets, and, furthermore, the smartphone 200 is an example of an operation unit that is capable of movably controlling the vehicle 10 from outside the vehicle 10 via wireless communication. Note that the wireless communication between the receiver 100 and the smartphone 200 is by no means limited to BLE, and communication based on WLAN (Wireless Local Area Network) or other standards may be used as well.

In this position estimating system 300, for example, the position estimating unit 51 measures the position of the smartphone 200 based on the AoA (Angle of Arrival) scheme, and determines where, around the vehicle 10, the smartphone 200 is positioned.

In the event the AoA scheme is used, for example, the position estimating unit 51 estimates the position of the smartphone 200 by using two angles of arrival of advertising packets, determined individually by two receivers 100, and the positional relationship between the two receivers 100 (the distance between the two receivers 100).

Also, for example, in the event only one receiver 100 receives an advertising packet, the position estimating unit 51 determines an approximate position of the vehicle 10 based on the advertising packet's angle of arrival, determined by one receiver 100, and based on the RSSI (Received Signal Strength Indicator) value of the advertising packet. This is possible because the RSSI value gives an approximate distance from the receiver 100 to the smartphone 200.

Figure 2:
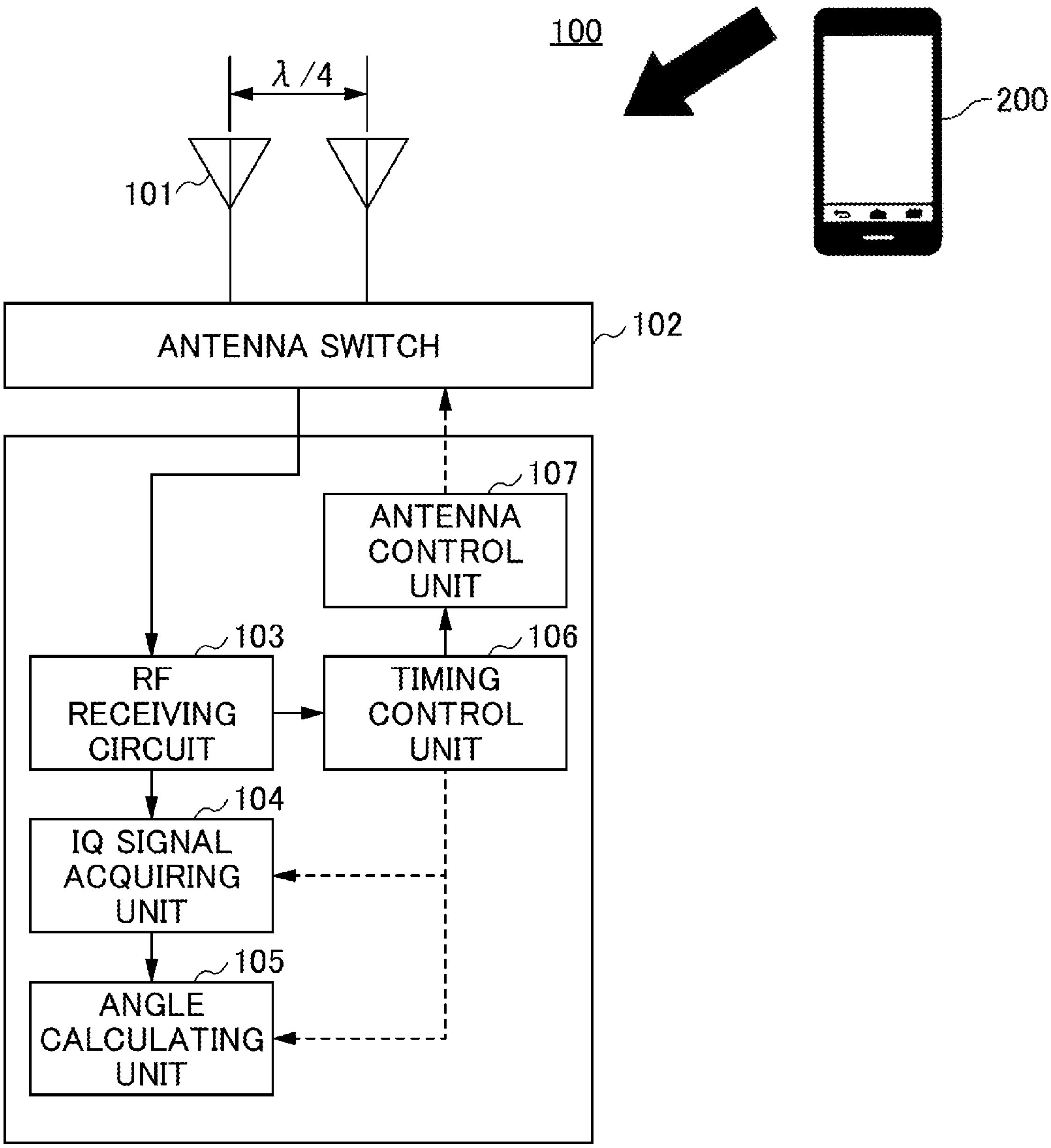
FIG. 2 is a diagram that shows a receiver 100 and a smartphone 200.

FIG. 2 is a diagram that shows a receiver 100 and a smartphone 200. Here, the process in which the receiver 100 receives an advertising packet and calculates its angle of arrival will be briefly described with reference to FIG. 2, and, furthermore, the related configurations will be briefly described.

The receiver 100 includes two antennas 101, an antenna switch 102, an RF (Radio Frequency) receiving circuit 103, an IQ signal acquiring unit 104, an angle calculating unit 105, a timing control unit 106, and an antenna control unit 107. Note that, although an example will be described here in which the receiver 100 has two antennas 101, the receiver 100 has only to have multiple antennas 101, and the number of antennas 101 may be three or more.

The two antennas 101 are spaced apart by approximately a quarter (λ/4) of the wavelength (λ) at the communication frequency, and are connected to the RF receiving circuit 103 via the antenna switch 102. At the output end of the RF receiving circuit 103, the IQ signal acquiring unit 104 and the angle calculating unit 105 are connected, in this order, and, furthermore, the timing control unit 106 is connected.

The timing control unit 106 outputs, based on the timing at which an advertising packet is input to the RF receiving circuit 103, a signal that indicates a predetermined timing, to the IQ signal acquiring unit 104, the angle calculating unit 105, and the antenna control unit 107.

While waiting for receipt, the receiver 100 waits until a specific signal (for example, a signal to indicate that the advertising address of the advertising packet and the authentication ID (identifier) contained inside the payload match the ID used on the vehicle 10 side) is detected in the RF receiving circuit 103, with the antenna control unit 107 having caused the antenna switch 102 to select one specific antenna unit 101.

When receipt is detected in the RF receiving circuit 103, the timing control unit 106 starts operating, the IQ signal acquiring unit 104 acquires an IQ signal, and the antenna control unit 107 makes a switch in the antenna switch 102 according to the timing.

When the angle calculating unit 105 detects that receipt of one advertising packet is completed, based on the timing-indicating signal output from the antenna control unit 107, the angle calculating unit 105 calculates the angle at which the advertising packet arrived, by using the IQ signal acquired by the IQ signal acquiring unit 104.

As described above, the receiver 100 calculates an angle of arrival based on an advertising packet.

Figure 3:
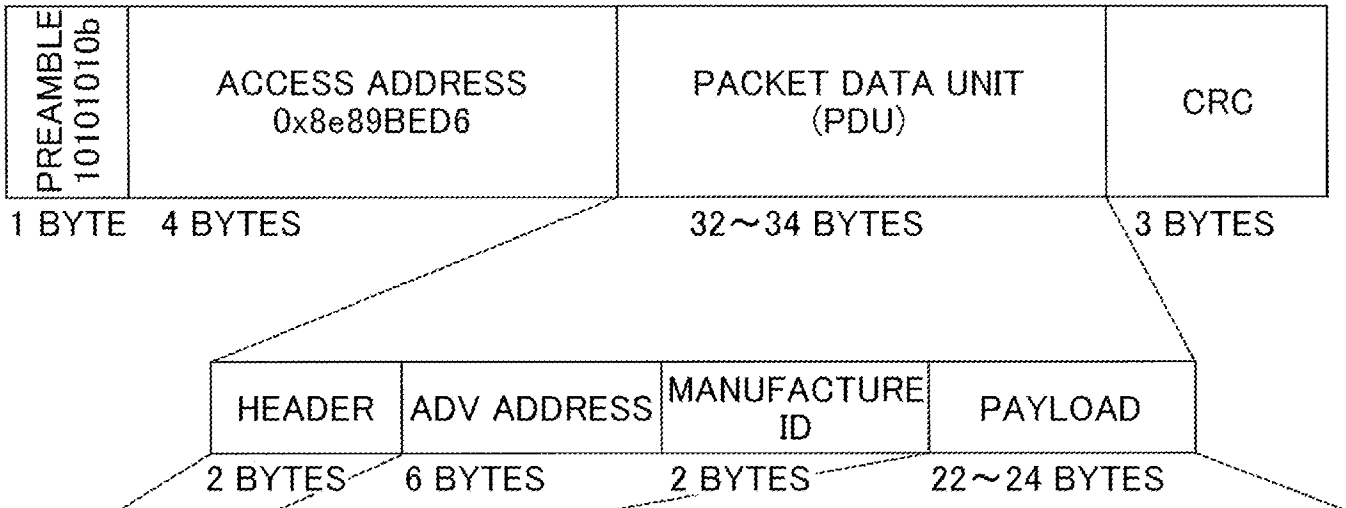
FIG. 3 is a diagram that shows the frame structure of an advertising packet.

FIG. 3 is a diagram that shows the frame structure of an advertising packet. The advertising packet is transmitted from the smartphone 200 in multiple channels (transmitting channels), and the receiver 100 receives the advertising packet of a desirable receiving channel by switching between multiple receiving channels in order of time. A transmitting channel is a channel in which the smartphone 200 transmits the advertising packet. A receiving channel is a channel in which the receiver 100 receives the advertising packet.

In the frame structure of the advertising packet, a preamble, an access address, a PDU (Packet Data Unit), and a CRC (Cyclic Redundancy Check) are contained, which are 1 byte, 4 bytes, 32 to 34 bytes, and 3 bytes, respectively.

Among these, the PDU includes a header, an advertising address (adv address), a manufacture ID, and a payload, which are 2 bytes, 6 bytes, 2 bytes, and 22 to 24 bytes, respectively.

When the smartphone 200 transmits an advertising packet based on BLE, the smartphone 200 transmits the advertising packet by using three transmitting channels, namely 37 ch, 38 ch, and 39 ch, and performs modulation and whitening upon transmission. Modulation is applied to the whole, from the preamble to the CRC, and whitening is performed on the PDU's advertising address, manufacture ID, and payload.

Furthermore, whitening is performed by using a key for 37 ch when the advertising packet is transmitted in 37 ch, performed by using a key for 38 ch when the advertising packet is transmitted in 38 ch, and performed by using a key for 39 ch when the advertising packet is transmitted in 39 ch.

When the smartphone 200 transmits an advertising packet based on BLE, the smartphone 200 transmits the advertising packet by using three transmitting channels, in most cases, without regard to which transmitting channel the transmission data is intended for.

It then follows that, in BLE, when trying to make transmission data different for every transmitting channel, nine types of advertising packets, carrying nine types of transmission data, have to be transmitted cyclically, and received by the receiver 100. These nine types of transmission data include transmission data for 37 ch, transmitted in the three transmitting channels of 37 ch, 38 ch, and 39 ch (three types of transmission data in total), transmission data for 38 ch, transmitted in the three transmitting channels of 37 ch, 38 ch, and 39 ch (three types of transmission data in total), and transmission data for 39 ch, transmitted in the three transmitting channels of 37 ch, 38 ch, and 39 ch (three types of transmission data in total).

To calculate the angle of arrival, the receiver 100 uses three types of transmission data among these, namely, the transmission data for 37 ch whitened by using the transmitting channel key of 37 ch, the transmission data for 38 ch whitened by using the transmitting channel key of 38 ch, and the transmission data for 39 ch whitened by using the transmitting channel key of 39 ch.

One problem with conventional communication methods is that, when nine types of advertising packets are received up to the payload and subjected to processes such as FSK (Frequency Shift Keying) in order to identify between transmission data for 37 ch, transmission data for 38 ch, and transmission data for 39 ch, a significant processing load is placed on the receiver's MCU (Micro Computer Unit) and elsewhere, which makes it difficult to perform other tasks and therefore lowers the efficiency of processes, or increases the power consumption.

In the communication method according to the present embodiment, as shown in FIG. 3, the three channels have payloads of different data lengths, and the data length of the PDU is written in the first byte of each header, as shown surrounded by a broken line. Here, for example, the payload of 37 ch is 24 bytes, the payload of 38 ch is 23 bytes, and the payload of 39 ch is 22 bytes. Consequently, the data length written in the first byte of the header is 34 bytes in the case of 37 ch, 33 bytes in the case of 38 ch, and 32 bytes in the case of 39 ch.

In this way, since the data length of the PDU is written in the header, when the receiver 100 receives an advertising packet, the receiver 100 can determine which of the three channels the advertising packet belongs to, by reading the header. That is, when the receiver 100 receives packets other than the three types of advertising packets for use for calculating the angle of arrival, the receiver 100 does not need to receive the payload, which is the longest in data length, so that it is possible, for example, to reduce the processing load on the MCU of the receiver 100 and elsewhere.

To be more specific, when reading the headers of advertising packets, the receiver 100 reads data up to the advertising address in the PDU. Then, when the receiver 100 receives the three types of advertising packets for use for calculating the angle of arrival, the receiver 100 receives the PDU's manufacture ID and payload. Furthermore, when the receiver 100 receives packets other the three types of advertising packets for use for calculating the angle of arrival, the receiver 100 does not receive the PDU's manufacture ID and payload. In this case, the manufacture IDs and payloads in the PDUs of the advertising packets are examples of "the rest" of the advertising packets.

Furthermore, when the receiver 100 receives the three types of advertising packets for use for calculating the angle of arrival, the receiver 100 determines the angle of arrival by detecting phase differences between the sinusoidal waveforms obtained by applying an FSK process to the whitened payload data. However, payload data that is whitened in the smartphone 200 is not composed of consecutive alternating 1s and 0s, and might include sections where there are two or more consecutive is or two or more consecutive 0s. No sinusoidal wave with a constant frequency can be obtained even when such data is subjected to an FSK process, and there is a possibility that phase difference cannot be detected properly, and the angle of arrival cannot be determined accurately.

So, according to the present embodiment, payload data that is in the whitened state in the smartphone 200 is composed of consecutive alternating 1s and 0s. Such payload data has no meaning in itself, and, upon whitening, is converted into data composed of consecutive alternating 1s and 0s.

Figure 4:
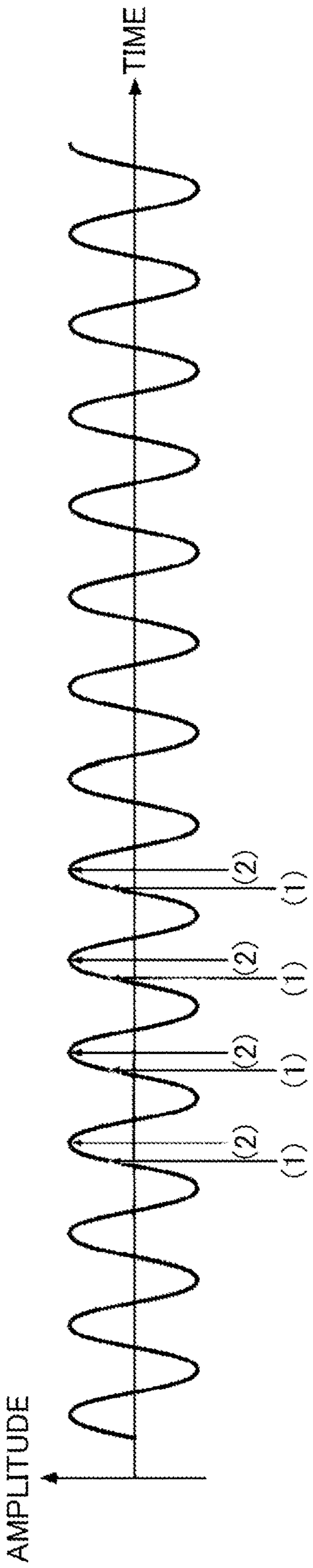
FIG. 4 is a diagram that shows a CW signal.

FIG. 4 is a diagram that shows a CW (Continuous Wave) signal. FIG. 4 shows the waveform of a CW signal, which is obtained by whitening the payload data shown in FIG. 3 in the smartphone 200, receiving an advertising packet in the receiver 100, and performing an FSK process in the receiver 100.

The whitened payload data is composed of consecutive alternating 1s and 0s, so that a sine wave signal having a constant frequency can be obtained by performing an FSK process, as shown in FIG. 4. The receiver 100 calculates, for example, the phase difference of the CW wave between a time point (1) and a time point (2), and estimates the angle of arrival of the advertising packet.

Furthermore, the use of such a CW signal makes it possible to estimate the angle of arrival if at least part of the whitened payload data is available.

Figure 5:
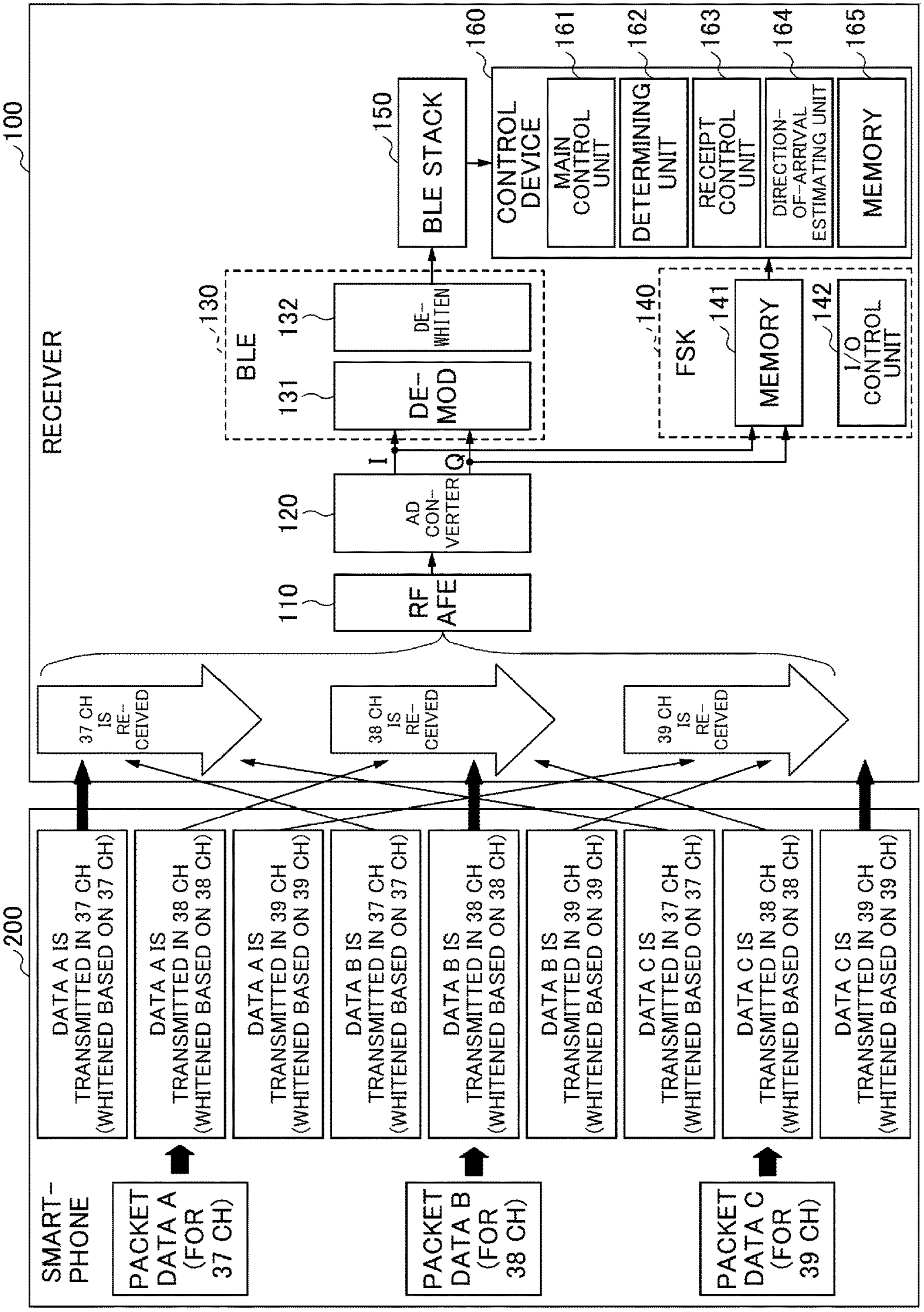
FIG. 5 is a diagram that shows the structure of the receiver 100 and transmission data of the smartphone 200.

FIG. 5 is a diagram that shows the structure of the receiver 100 and transmission data of the smartphone 200.

The receiver 100 includes an RFAFE (Radio Frequency Analog Front End) 110, an AD (Analog to Digital) converter 120, a BLE circuit 130, an FSK process unit 140, a BLE stack 150, and a control device 160. In FIG. 5, the antenna 101 and the antenna switch 102 shown in FIG. 2 are omitted.

The RFAFE 110 is an analog front end, and is a circuit that is equivalent to the RF receiving circuit 103 shown in FIG. 2. When receiving BLE advertising packets, the RFAFE 110 receives them by switching between 37 ch, 38 ch, and 39 ch in order of time. Accordingly, FIG. 5 shows three arrows that indicate receipt of 37 ch, 38 ch, and 39 ch. The RFAFE 110 receives advertising packets in order, in three receiving channels, by switching the receiving channel between 37 ch, 38 ch, and 39 ch in order, at predetermined time intervals.

The AD converter 120, connected to the output end of the RFAFE 110, has a mixer that multiplies each advertising packet, output from the RFAFE 110, by a carrier wave that is 90 degrees out of phase, and a digital low-pass filter provided at the output end of the mixer performs an I/Q signal conversion and a digital conversion, and outputs the resulting signals.

The BLE circuit 130 is provided at the output end of the AD converter 120, and has a demodulator (De-Mod) 131 that demodulates the I/Q signals output from the AD converter 120 and acquires the data, and a de-whitening unit (De-Whiten) 132 that de-whitens the demodulated data.

Note that the BLE circuit 130 demodulates and de-whitens the I/Q signals, not when the advertising packets for use for calculating the angle of arrival are received, but when advertising packets to contain meaningful payload data such as messages or normal packets are received.

The FSK process unit 140 is provided in parallel with the BLE circuit 130, at the output end of the AD converter 120, and has a memory 141 that directly inputs the I/Q signals output from the AD converter 120 to the control device 160, and an I/O control unit 142 that controls the input/output of I/Q signals in the memory 141.

The BLE stack 150 is provided at the output end of the de-whitening unit 132, which is in the BLE circuit 130, holds the I/Q signals of packets such as demodulated and de-whitened messages, and inputs these to the control device 160.

The control device 160 includes a main control unit 161, a determining unit 162, a receipt control unit 163, a direction-of-arrival estimating unit 164, and a memory 165. The control device 160 is implemented by, for example, a microcomputer having a CPU, a RAM, a ROM, an internal bus, and so forth.

The main control unit 161, the determining unit 162, the receipt control unit 163, and the direction-of-arrival estimating unit 164 show the functions executed by the control device 160 in the form of functional blocks. Furthermore, the memory 165 is a functional representation of the memory of the control device 160.

Furthermore, here, processes that are performed based on I/Q signals generated from the advertising packets that the control device 160 uses to calculate the angle of arrival will be described, and, the description of processes that are performed based on I/Q signals generated from other packets such as messages will be omitted. Furthermore, the control device 160 also includes the functions of the timing control unit 106 and the antenna control unit 107 shown in FIG. 2, but these will be omitted here.

The main control unit 161 is a process unit to manage the control processes in the control device 160, and executes processes other than the processes executed by the determining unit 162, the receipt control unit 163, and the direction-of-arrival estimating unit 164.

The determining unit 162 reads the data length information contained in the header information of the I/Q signals input from the memory 141 of the FSK process unit 140, and compares this information against channel data that is stored in the memory 165, thereby determining whether the transmitting channel of the transmission data contained an advertising packet's PDU payload is 37 ch, 38 ch, or 39 ch. The data length information contained in the header information of I/Q signals is an example of data length information contained in the header information of advertising packets received by the receiver 100.

Note that the channel data refers to data that indicates the data lengths of the PDUs of 37 ch, 38 ch, and 39 ch are 34 bytes, 33 bytes, and 32 bytes, respectively, and is stored in the memory 165.

When a transmitting channel is identified in the determining unit 162 and matches the receiving channel, the receipt control unit 163 acquires the I/Q signals of the rest of the packet from the memory 141. The rest of the packet is the manufacture ID and payload of the advertising packet shown in FIG. 4. If the transmitting channel identified in the determining unit 162 does not match the receiving channel, the receipt control unit 163 does not acquire the rest of the packet's I/Q signals from the memory 141. This is equivalent to not receiving the rest of the packet.

The direction-of-arrival estimating unit 164 estimates the angles at which the advertising packets arrived at the receiver 100 (angles of arrival), from the phase difference between the respective I/Q signals generated from the advertising packets received by the two antennas 101 of the receiver 100 (see FIG. 2), and stores data representing the estimated angles of arrival in the memory 165. The direction-of-arrival estimating unit 164 calculates the phase difference of a CW wave as shown in FIG. 4 to estimate the angles of arrival of the advertising packets.

The memory 165 stores programs and data necessary for the control device 160 to perform control processes. For example, the memory 165 stores channel data that indicates that the data lengths of the PDUs of 37 ch, 38 ch, and 39 ch, are 34 bytes, 33 bytes, and 32 bytes, respectively, and stores data that represents the angles of arrival estimated in the direction-of-arrival estimating unit 164. The data to represent the angles of arrival is transferred to the position estimating unit 51 of the ECU 50 via a network such as a CAN (Controller Area Network) of the vehicle 10.

As a result of this, the position of the smartphone 200 is estimated by the position estimating unit 51 according to the position estimating method of the embodiment.

Here, the receiver 100 and the smartphone 200 constitute the communication system and the direction-of-arrival estimating system of the embodiment. The direction-of-arrival estimating system includes multiple antennas 101 for the receiver 100 (see FIG. 2), a receipt control unit 163, and a direction-of-arrival estimating unit 164.

In FIG. 5, the smartphone 200 transmits advertising packets containing transmission data A for 37 ch, transmission data B for 38 ch, and transmission data C for 39 ch, based on BLE. At this time, in the smartphone 200, transmission data A is whitened by using three transmitting channel keys for 37 ch, 38 ch, and 39 ch, and transmitted on each of the three transmitting channels of 37 ch, 38 ch, and 39 ch.

Also, in the smartphone 200, transmission data B is whitened by using three transmitting channel keys for 37 ch, 38 ch, and 39 ch, and transmitted on each of the three transmitting channels of 37 ch, 38 ch, and 39 ch. Furthermore, in the smartphone 200, transmission data C is whitened by using three transmitting channel keys for 37 ch, 38 ch, and 39 ch, and transmitted on each of the three transmitting channels of 37 ch, 38 ch, and 39 ch.

In this way, advertising packets to contain nine types of transmission data, which are transmission data A, B, and C, each whitened by using three transmitting channel keys for 37 ch, 38 ch, and ch, are transmitted from the smartphone 200 in broadcast communication. This is a transmission process that the smartphone 200 performs according to the communication method of the embodiment.

Assuming a case like this, in the event the receiving channel of the RFAFE 110 is 37 ch, the receiver 100 identifies the data, in which transmission data A is whitened by using the transmitting channel key of 37 ch, from the PDU header of the advertising packet, and also receives the PDU's manufacture ID and payload. This is as indicated by the thick arrow.

Also, in the event the receiving channel of the RFAFE 110 is 37 ch and the receiver 100 determines that transmission data B and C are whitened by using the transmitting channel key of 37 ch, from the PDU headers of the advertising packets, the receiver does not receive the PDUs' manufacture IDs and payloads. This is as indicated by the thin arrow.

Similarly, when the receiving channel in the RFAFE 110 is 38 ch, the receiver 100 identifies the data, in which transmission data B is whitened by using the transmitting channel key of 38 ch, from the PDU header of the advertising packet, and also receives the PDU's manufacture ID and payload. This is as indicated by the thick arrow.

Also, in the event the receiving channel in the RFAFE 110 is 38 ch and the receiver 100 determines that transmission data A and C are whitened by using the transmitting channel key of 38 ch, from the headers of the PDUs in the advertising packets, the receiver 100 does not receive the PDUs' manufacture IDs and payloads. This is as indicated by the thin arrow.

Similarly, in the event the receiving channel in the RFAFE 110 is 39 ch and the receiver 100 identifies the data, in which transmission data C is whitened by using the transmitting channel key of 39 ch, from the PDU header of the advertising packet, the receiver 100 also receives the PDU's manufacture ID and payload. This is as indicated by the thick arrow.

Furthermore, when the receiving channel in the RFAFE 110 is 39 ch and the receiver 100 determines that transmission data A and B are whitened by using the transmitting channel key of 39 ch, from the PDU headers of the advertising packets, the receiver 100 does not receive the PDUs' manufacture IDs and payloads. This is as indicated by the thin arrow.

As described above, determining what the receiver 100 receives based on PDU headers is a receiving process the receiver 100 performs according to the communication method of the embodiment.

Figure 6A:
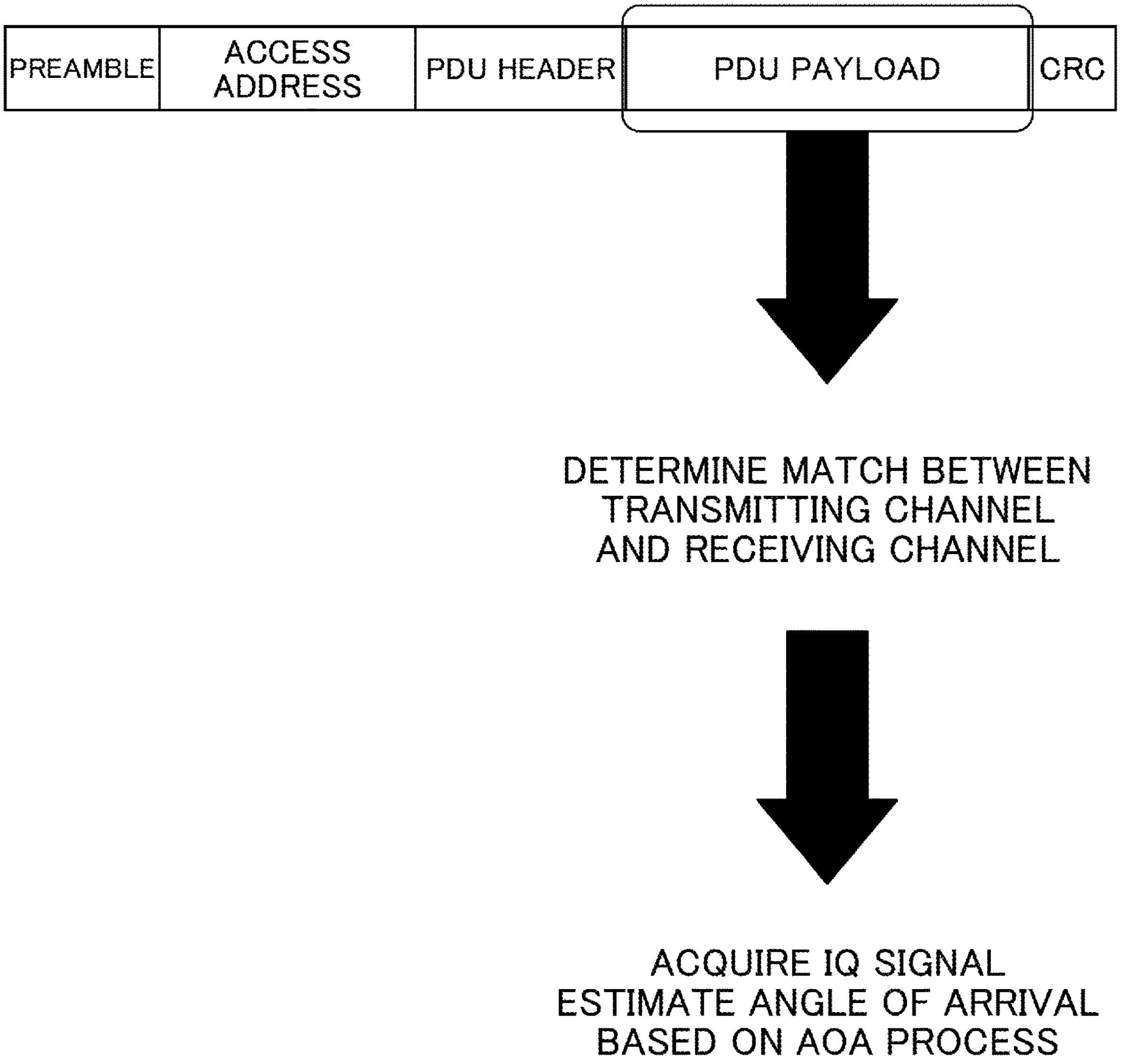
FIG. 6A is a diagram that explains how to receive an advertising packet.
Figure 6B:
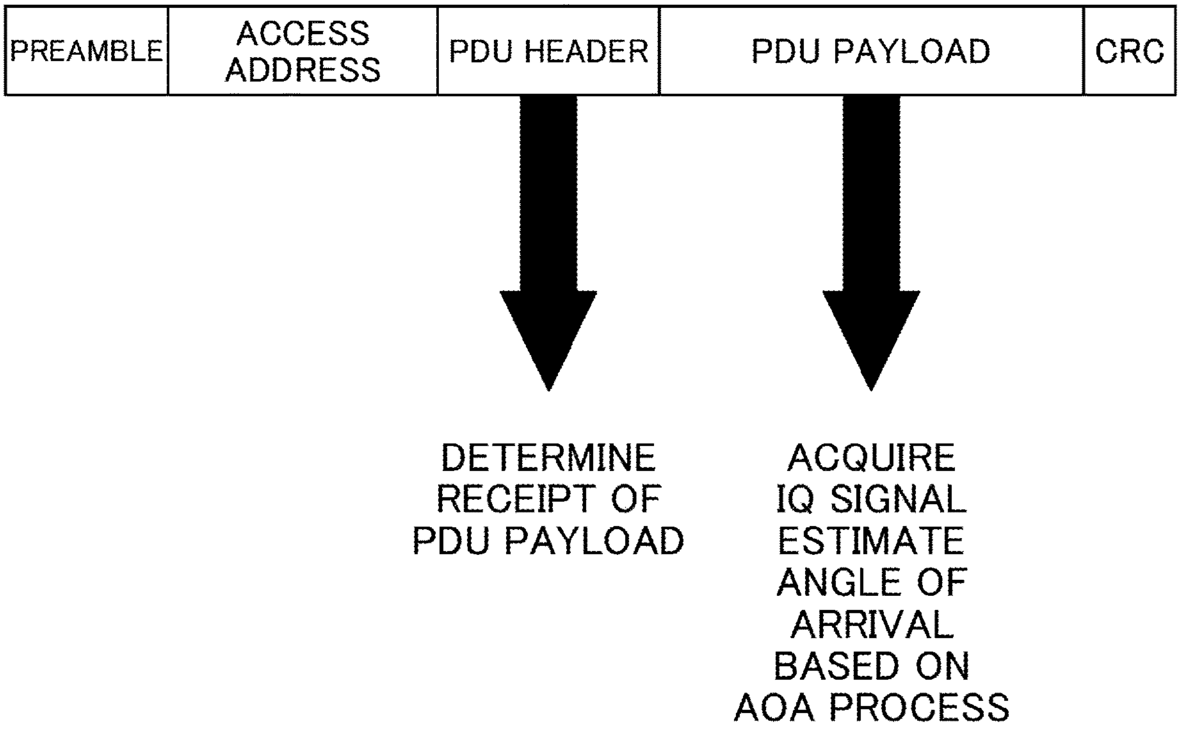
FIG. 6B is a diagram that explains how to receive an advertising packet.

FIGS. 6A and 6B are diagrams that explain how to receive an advertising packet. FIGS. 6A and 6B each show a preamble, an access address, a PDU header, a PDU payload, and a CRC. The PDU header corresponds to the PDU header of FIG. 3, and the PDU payload corresponds to the PDU payload of FIG. 3. Note that, in FIGS. 6A and 6B, the PDU advertising address and manufacture ID of FIG. 3 are omitted.

As shown in FIG. 6(A), in the event a communication method of a comparative example, which does not involve making determinations based on PDU headers, is used, after data is received up to the PDU payload and whether or not the ID contained in the PDU payload matches the ID used on the vehicle 10 side is determined, the I/Q signal is acquired, and the angle of arrival is estimated based on the AoA scheme. However, a problem with always receiving the PDU payload and then performing two steps of process is that a significant processing load is placed on the receiver's MCU and elsewhere.

On the other hand, as shown in FIG. 6B, the communication method according to the present embodiment uses the PDU header of an advertising packet to determine whether or not to receive the remaining PDU payload. Furthermore, when an advertising packet's PDU payload is received, the communication method according to the present embodiment uses this to acquire the I/Q signal and to estimate the angle of arrival based on the AoA scheme. By using such a scheme, the communication method according to the embodiment solves the problem with the communication method of the comparative example.

Figure 7A:
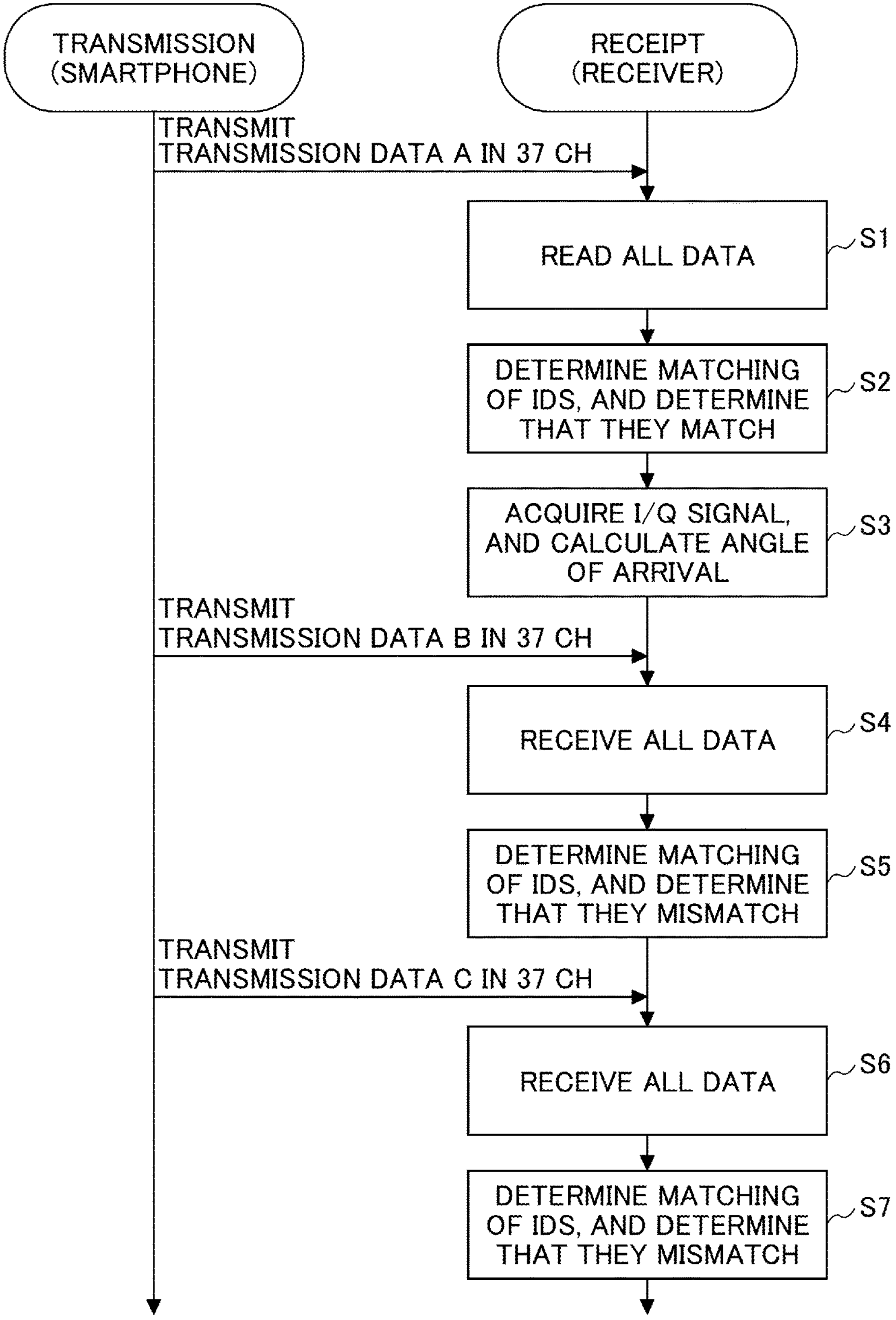
FIG. 7A is a task diagram that shows an advertising packet transmission process.
Figure 7B:
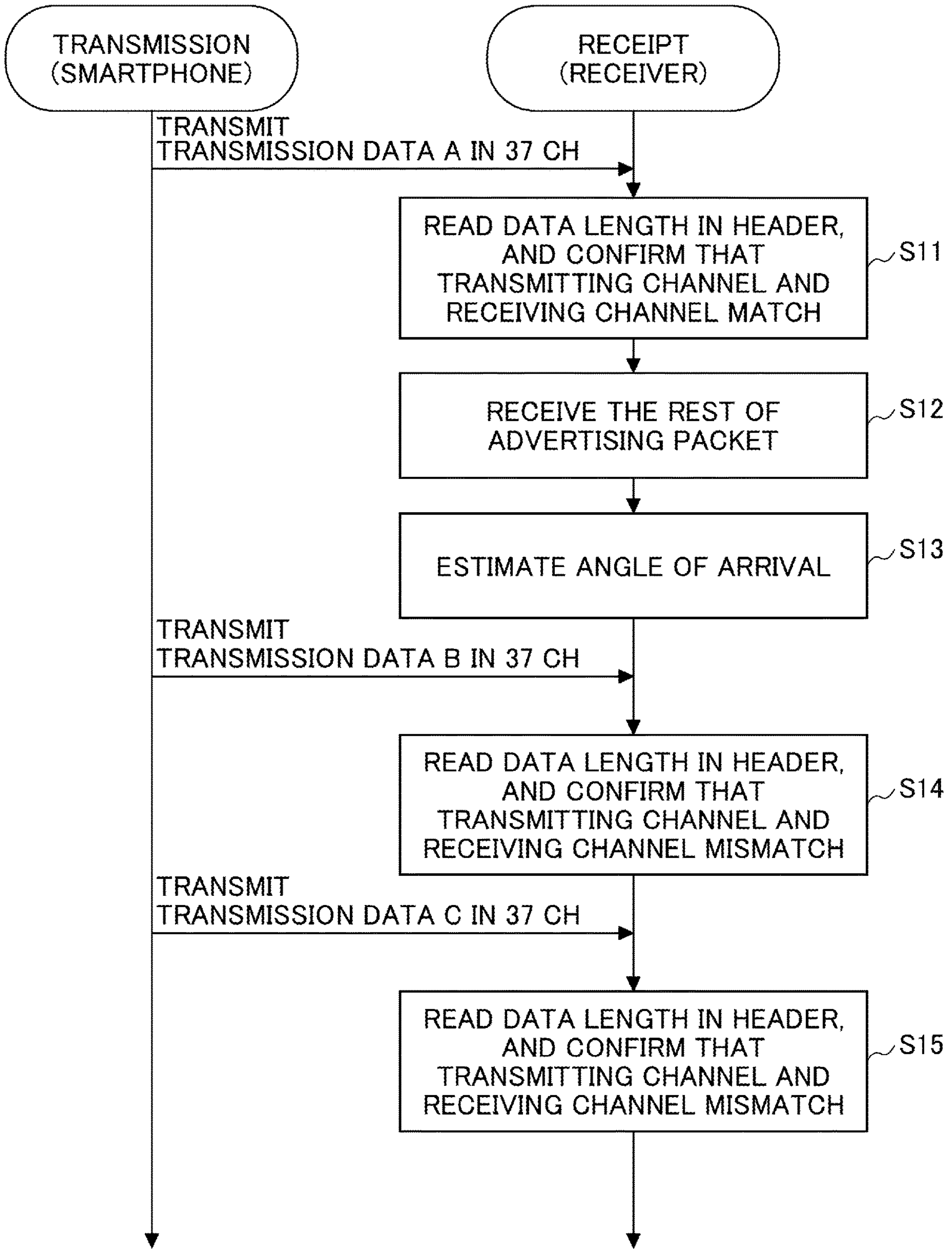
FIG. 7B is a task diagram that shows an advertising packet transmission process.

FIGS. 7A and 7B are task diagrams that each show an advertising packet transmission process. FIG. 7A shows the transmission process according to a comparative example in which no determinations are made based on PDU headers, and FIG. 7B shows the transmission process of the present embodiment. Here, a case of transmitting transmission data A, B, and C by using 37 ch for the transmitting channel and using 37 ch for the receiving channel will be described.

Also, the comparative example shown in FIG. 7A goes as follows. The smartphone 200 whitens transmission data A by using the transmitting channel key of 37 ch, and transmits an advertising packet on the transmitting channel of 37 ch.

The receiver 100 of a comparative example receives all the data in the advertising packet of transmission data A (step S1).

Next, the receiver 100 of a comparative example determines whether or not the ID included in the PDU payload matches the ID used on the vehicle 10 side, and determines that these IDs match (step S2).

Next, the receiver 100 acquires the I/Q signal in the BLE stack, and calculates the advertising packet's angle of arrival (step S3). Since the payload data of the advertising packet, in which transmission data A is whitened by using the key for 37 ch, is composed of consecutive alternating 1s and 0s, the angle of arrival can be calculated based on phase difference. Note that, if the whitening key used is not the one intended for the channel, the data is not composed of consecutive alternating 1s and 0s, and therefore the angle of arrival cannot be calculated based on phase difference.

Next, the smartphone 200 whitens transmission data B by using the transmitting channel key of 37 ch, and transmits an advertising packet on the transmitting channel of 37 ch.

The receiver 100 of a comparative example receives all the data in the advertising packet of transmission data B (step S4).

Next, the receiver 100 of a comparative example determines whether or not the ID included in the PDU payload matches the ID used on the vehicle 10 side, and, upon determining that the IDs do not match, ends the process for transmission data B (step S5).

Next, the smartphone 200 whitens transmission data C by using the transmitting channel key of 37 ch, and transmits an advertising packet on the transmitting channel of 37 ch.

The receiver 100 of a comparative example receives all the data in the advertising packet of transmission data C (step S6).

Next, the receiver 100 of a comparative example determines whether or not the ID included in the PDU payload matches the ID used on the vehicle 10 side, and, upon determining that the IDs do not match, ends the process for transmission data C (step S7).

In this way, according to a comparative example in which no determinations are made based on PDU headers, data is received up to the PDU payload in all cases, and then the angle of arrival is estimated based on the AoA scheme if the ID included in the PDU payload matches the ID used on the vehicle 10 side, or the process for that data is ended if the transmitting channel and the receiving channel do not match. As described above, one problem with always receiving advertising packet data up to the PDU payload is that a significant processing load is placed on the receiver's MCU and elsewhere.

In FIG. 7B, the smartphone 200 whitens transmission data A by using the transmitting channel key of 37 ch, and transmits an advertising packet on the transmitting channel of 37 ch. This is a transmission process the smartphone 200 performs according to the communication method of the embodiment.

The receiver 100 reads the data length in the PDU header, compares it against channel data in the memory 165, and confirms that the transmitting channel (37 ch) and the receiving channel (37 ch) match (step S11). In this way, the receiver 100 determines whether or not the transmitting channel (37 ch) and the receiving channel (37 ch) match, based on the PDU header, and this is a receiving process the receiver 100 performs according to the communication method of the embodiment.

Next, the receiver 100 receives the rest of the advertising packet (PDU's manufacture ID and payload) (step S12). In this way, the receiver 100 receives the rest of the data when the transmitting channel (37 ch) and the receiving channel (37 ch) match, and this is a receiving process the receiver 100 performs according to the communication method of the embodiment.

Next, the receiver 100 estimates the angle of arrival of the advertising packet (step S13). The receiver 100 can thus calculate the angle of arrival by using the frequency of the transmitting channel identified from the PDU header.

In this way, the smartphone 200 transmits the advertising packet containing whitened transmission data A, and the smartphone 200 transmits whitened transmission data A, and the receiver 100 estimates the angle of arrival, and this is a process according to the direction-of-arrival estimating method of the embodiment.

Next, the smartphone 200 whitens transmission data B by using the transmitting channel key of 37 ch, and transmits an advertising packet in the transmitting channel of 37 ch. This is a transmission process the smartphone 200 performs according to the communication method of the embodiment.

The receiver 100 reads the data length in the PDU header, compares it against channel data in the memory 165, and confirms that the transmitting channel (37 ch) and the receiving channel (38 ch) do not match (step S14). Here, the receiver 100 ends the process for transmission data B, without receiving the rest of the advertising packet (PDU's manufacture ID and payload).

In this way, when the transmitting channel (37 ch) and the receiving channel (38 ch) do not match, the receiver 100 ends the process for the advertising packet without receiving the rest of the data, and this is a receiving process the receiver 100 performs according to the communication method of the embodiment.

Next, the smartphone 200 whitens transmission data C by using the transmitting channel key of 37 ch, and transmits an advertising packet on the transmitting channel of 37 ch. This is a transmission process the smartphone 200 performs according to the communication method of the embodiment.

The receiver 100 reads the data length in the PDU header, compares it against channel data in the memory 165, and confirms that the transmitting channel (37 ch) and the receiving channel (39 ch) do not match (step S15). Here, the receiver 100 ends the process for transmission data C, without receiving the rest of the advertising packet (PDU's manufacture ID and payload).

In this way, when the transmitting channel (37 ch) and the receiving channel (39 ch) do not match, the receiver 100 ends the process for the advertising packet without receiving the rest of the data, and this is a receiving process the receiver 100 performs according to the communication method of the embodiment.

As described above, according to the embodiment, the rest of advertising packet data (PDU's manufacture ID and payload) is received only when the transmitting channel and the receiving channel match. Also, when the transmitting channel and the receiving channel do not match, the process for that data is ended, without receiving the rest of advertising packet data (PDU's manufacture ID and payload).

Thus, the PDU header can provide a basis for determining the need for the remaining data, thereby solving the problem with the communication method of a comparative example.

As described above, according to the embodiment, the data length of the PDU payload is made different per transmitting channel, so that an advertising packet's transmitting channel can be identified by receiving the header containing data that indicates the data length of the PDU payload.

Therefore, it is possible to provide a communication method, a direction-of-arrival estimating method, a position estimating method, a communication system, a direction-of-arrival estimating system, a position estimating system, and a receiver, in which the PDU header of an advertising packet can provide a basis for determining the need for the remaining data.

Also, the receiver 100 receives the rest of the advertising packet (PDU's manufacture ID and payload) when the transmitting channel and the receiving channel match, and not receive the rest of the advertising packet when the transmitting channel and the receiving channel do not match. Therefore, it is possible to reduce the power consumption, improve the efficiency of processes, and so forth.

Furthermore, by using BLE advertising packets, the smartphone 200 and the receiver 100 can determine whether or not data such as whitened payload is needed, based on unwhitened PDU headers.

In addition, the receiver 100 estimates the direction of arrival of an advertising packet, received by each of multiple antennas 101, based on at least part of the rest of the data of the advertising packet (whitened PDU payload), so that the receiver 100 can calculate the angle of arrival by using the frequency of the transmitting channel identified based on PDU headers.

Furthermore, when the transmitting channel and the receiving channel match, the smartphone 200 transmits an advertising packet, in which at least part of the rest of the data of the advertising packet constitutes a bit string of consecutive alternating 0s and 1s upon encoding, so that the I/Q signal can be acquired with ease by using data that is yet to be de-whitened.

In addition, the position of the smartphone 200 is estimated based on directions of arrival that are estimated individually by multiple receivers 100, so that the angle of arrival can be calculated by using the frequency of the transmitting channel identified based on PDU headers.

Note that an example has been described above in which the smartphone 200 transmits nine types of data, in which transmission data A, B, and C are each whitened by using three transmitting channel keys for 37 ch, 38 ch, and 39 ch.

However, the smartphone 200 may transmit three types of data, in which transmission data A, B, and C are respectively whitened by using three transmitting channel keys for 37 ch, 38 ch, and 39 ch. In this case, the smartphone 200 will transmit data in which transmission data A is whitened by using the transmitting channel key of 37 ch, data in which transmission data B is whitened by using the transmitting channel key of 38 ch, and data in which transmission data C is whitened by using the transmitting channel key of 39 ch.

Even in this case, the receiver 100 can identify between the transmitting channels based on the PDU headers of advertising packets, so that it is possible to identify transmitting channels quickly, compared to the conventional method of identifying the transmitting channels after receiving data up to the PDU payload.

Although a communication method, a direction-of-arrival estimating method, a position estimating method, a communication system, a direction-of-arrival estimating system, a position estimating system, and a receiver have been described above according to an exemplary embodiment of the present disclosure, the present disclosure is by no means limited to the embodiment disclosed in detail herein, and a variety of variations and changes are possible without departing from the scope of the herein-contained claims.

What is claimed is:

1. A communication method comprising:

transmitting, by a transmitter, advertising packets having different data lengths per transmitting channel; and identifying, by a receiver, a transmitting channel of an advertising packet based on data length information contained in header information of the advertising packet, wherein the receiver receives rest of data in the advertising packet when the identified transmitting channel and a receiving channel match, and not receive the rest of the data in the advertising packet when the identified transmitting channel and the receiving channel do not match.

2. A direction-of-arrival estimating method using the communication method according to claim 1, wherein the receiver estimates a direction of arrival of the advertising packet based on at least part of rest of data of a plurality of advertising packets that are each received individually by each of a plurality of antenna elements.

3. The direction-of-arrival estimating method according to claim 2, wherein the transmitter transmits an advertising packet, in which at least part of the rest of the data constitutes a bit string of consecutive alternating 0s and 1s upon encoding.

4. A position estimating method using the direction-of-arrival estimating method according to claim 2 or 3, wherein a position of the transmitter is estimated based on directions of arrival estimated by a plurality of receivers.

5. The communication method according to claim 1, wherein the transmitter prepares transmission data for each individual transmitting channel, and transmits each transmission data in all transmitting channels.

6. The communication method according to claim 1, wherein the transmitter transmits BLE (Bluetooth Low Energy) advertising packets.

7. A communication system comprising:

a transmitter configured to transmit advertising packets having different data lengths per transmitting channel; and a receiver configured to identify a transmitting channel of an advertising packet based on data length information contained in header information of the advertising packet, wherein the receiver:

has a plurality of antenna elements;

receives rest of data in the advertising packet when the identified transmitting channel and a receiving channel match, and not receive the rest of the data in the advertising packet when the identified transmitting channel and the receiving channel do not match; and estimates a direction of arrival of the advertising packet based on at least part of rest of data of a plurality of advertising packets that are each received individually by each of the plurality of antenna elements.

8. The direction-of-arrival estimating system according to claim 7, wherein the transmitter transmits an advertising packet, in which at least part of the rest of the data constitutes a bit string of consecutive alternating 0s and 1s upon encoding.

9. A position estimating system using the direction-of-arrival estimating system according to claim 7 or 8, wherein the position of the transmitter is estimated based on directions of arrival estimated by a plurality of receivers.

10. A receiver configured to:

receive an advertising packet from a transmitter configured to transmit advertising packets having different data lengths per transmitting channel, and identify a transmitting channel of the advertising packet based on data length information contained in header information of the advertising packet; and receive rest of data in the advertising packet when the identified transmitting channel and a receiving channel match, and not receive the rest of the data in the advertising packet when the identified transmitting channel and the receiving channel do not match.

* * * * *